United States Patent
Albers et al.

(10) Patent No.: US 12,523,016 B2
(45) Date of Patent: Jan. 13, 2026

(54) WORK IMPLEMENT FOR CONSTRUCTION MACHINE

(71) Applicant: Caterpillar Inc., Peoria, IL (US)

(72) Inventors: Riley A. Albers, Sugar Grove, IL (US); David Michael Worth, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 854 days.

(21) Appl. No.: 17/811,076

(22) Filed: Jul. 7, 2022

(65) Prior Publication Data
US 2024/0011249 A1  Jan. 11, 2024

(51) Int. Cl.
*E02F 9/26* (2006.01)
*E02F 3/34* (2006.01)

(52) U.S. Cl.
CPC . *E02F 9/26* (2013.01); *E02F 3/34* (2013.01)

(58) Field of Classification Search
CPC . E02F 3/34; E02F 3/431; E02F 3/3604; E02F 3/968; E02F 9/26; E02F 9/265; E02F 9/267; G01G 17/00; G01G 19/12; G01G 19/083; G01G 19/62; G07C 5/00; G07C 5/008; G01L 5/16; G01P 15/18
See application file for complete search history.

(56) References Cited

U.S. PATENT DOCUMENTS

| | | | |
|---|---|---|---|
| 7,614,597 B2* | 11/2009 | Matsumoto | B60N 2/0843 296/65.13 |
| 9,567,726 B2 | 2/2017 | Joergensen et al. | |
| 10,597,852 B2 | 3/2020 | Hori et al. | |
| 10,612,213 B2* | 4/2020 | Carpenter | E02F 9/2841 |
| 2015/0149049 A1 | 5/2015 | Bewley et al. | |
| 2017/0254049 A1 | 9/2017 | Kean et al. | |
| 2018/0127952 A1 | 5/2018 | Magliulo et al. | |
| 2020/0300691 A1* | 9/2020 | Bonthuis | G01G 19/62 |
| 2021/0303289 A1 | 9/2021 | Hoyt et al. | |
| 2022/0396177 A1* | 12/2022 | Jablonski | B60N 2/0244 |
| 2022/0412040 A1* | 12/2022 | Zitterbart | E02F 3/431 |

FOREIGN PATENT DOCUMENTS

| | | |
|---|---|---|
| CN | 210369091 U | 4/2020 |
| CN | 111877339 A | 11/2020 |
| KR | 20110006639 | 6/2011 |
| KR | 20200121543 | 10/2020 |

OTHER PUBLICATIONS

Written Opinion and International Search Report for Int'l. Patent Appln. No. PCT/US2023/068846, mailed Oct. 12, 2023 (10 pgs).

* cited by examiner

*Primary Examiner* — Joseph M Rocca
*Assistant Examiner* — Robert E Pezzuto

(57) ABSTRACT

A work implement for a construction machine includes a collection member, a first side wall, a second side wall, and a plate member coupled to the collection member, the first side wall, and the second side wall. The collection member, the first side wall, the second side wall, and the plate member together define a hollow space. Further, at least one of the first side wall, the second side wall, and the plate member define an opening that communicates with the hollow space. The work implement further includes a sensor mounting system including a cover, a plurality of mechanical fasteners adapted to couple the cover with the work implement, and a sensor mounted on the cover. Upon coupling of the cover with the first side wall, the sensor is partially received within the hollow space.

20 Claims, 5 Drawing Sheets

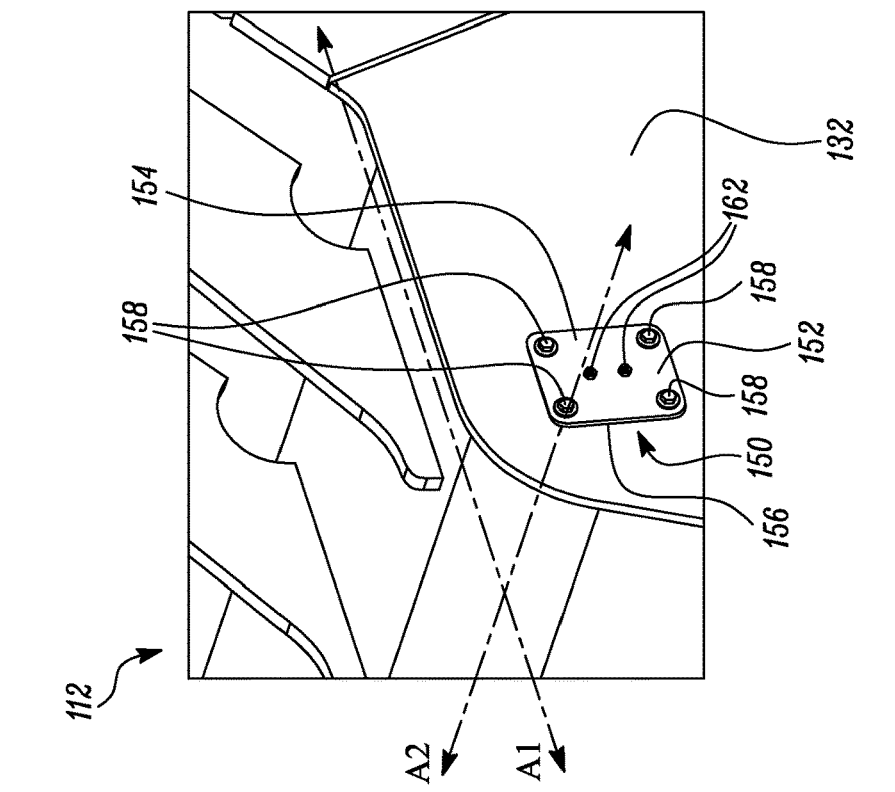
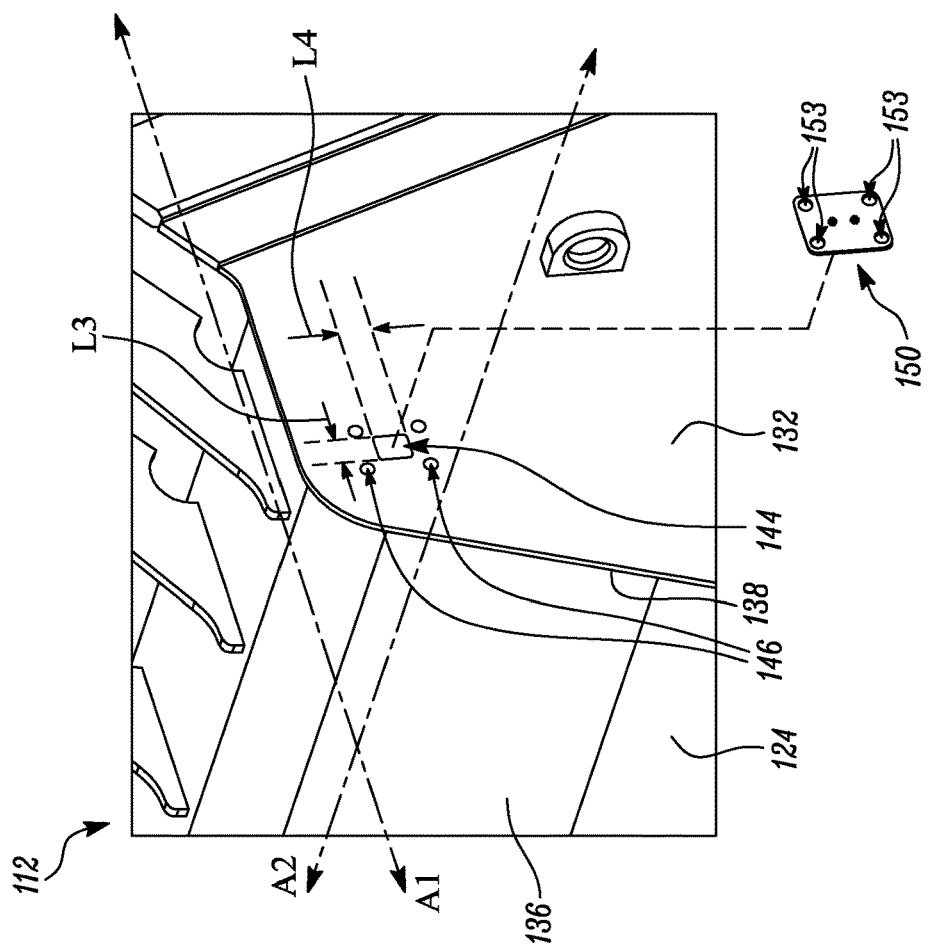
FIG. 4A
FIG. 4B

WORK IMPLEMENT FOR CONSTRUCTION MACHINE

TECHNICAL FIELD

The present disclosure relates to a work implement and a construction machine including the work implement.

BACKGROUND

A construction machine, such as a wheel loader, typically includes a work implement coupled to the construction machine. The work implement, such as a bucket, may be used to perform different work operations. For example, the work implement may be used to hold and move materials, such as, debris, soil, and the like. Further, different types of work implements may be coupled to the construction machine based on a type of the work operation that needs to be performed. Conventionally, a sensor may be coupled to the work implement for determining a type of the work implement that is presently coupled with the construction machine.

The sensor may be coupled with the work implement using a mounting arrangement. However, the sensor and the mounting arrangement may be susceptible to damage/failure while the construction machine is operating, such as, due to material overflow or contact with any obstacle at a worksite. In some examples, the mounting arrangement may be welded to the construction machine. However, the welded mounting arrangement may present durability risks. Further, conventional mounting arrangements may not be retrofittable, cost-effective, and durable.

U.S. Publication Application Number 2021/0303289 describes a system that may comprise a reader device comprising one or more memories, and one or more processors communicatively coupled to the one or more memories. The one or more processors may be configured to: obtain, using a wireless local area network communication, sensor data from a plurality of sensor devices associated with a machine; identify, from the sensor data, information identifying a sensor device of the plurality of sensor devices, generate sensor device information that associates the information identifying the sensor device with information identifying a component of the machine, and transmit the sensor device information to cause the machine to be updated using the sensor device information.

SUMMARY OF THE DISCLOSURE

In an aspect of the present disclosure, a work implement for a construction machine is provided. The work implement includes a collection member having a first end and a second end spaced apart from the first end along a lateral axis of the work implement. The work implement also includes a first side wall extending from the first end of the collection member along a longitudinal axis of the work implement. The work implement further includes a second side wall spaced apart from the first side wall along the lateral axis. The second side wall extends from the second end of the collection member along the longitudinal axis. The work implement includes a plate member coupled to the collection member, the first side wall, and the second side wall. The collection member, the first side wall, the second side wall, and the plate member together define a hollow space of the work implement. At least one of the first side wall, the second side wall, and the plate member define an opening that communicates with the hollow space of the work implement. The work implement further includes a sensor mounting system. The sensor mounting system includes a cover having a first surface and a second surface opposite the first surface. The cover is adapted to be removably coupled with at least one of the first side wall, the second side wall, and the plate member, such that the cover is in alignment with the opening. Upon coupling of the cover with at least one of the first side wall, the second side wall, and the plate member, the second surface of the cover faces the hollow space. The sensor mounting system also includes a plurality of mechanical fasteners adapted to removably couple the cover with the work implement. The sensor mounting system further includes a sensor mounted on the second surface of the cover, such that, upon coupling of the cover with at least one of the first side wall, the second side wall, and the plate member, the sensor is at least partially received within the hollow space.

In another aspect of the present disclosure, a construction machine is provided. The construction machine includes a frame. The construction machine also includes a linkage assembly movably coupled to the frame. The construction machine further includes a work implement movably coupled to the linkage assembly. The work implement includes a collection member having a first end and a second end spaced apart from the first end along a lateral axis of the work implement. The work implement also includes a first side wall extending from the first end of the collection member along a longitudinal axis of the work implement. The work implement further includes a second side wall spaced apart from the first side wall along the lateral axis. The second side wall extends from the second end of the collection member along the longitudinal axis. The work implement further includes a plate member coupled to the collection member, the first side wall, and the second side wall. The collection member, the first side wall, the second side wall, and the plate member together define a hollow space of the work implement. At least one of the first side wall, the second side wall, and the plate member define an opening that communicates with the hollow space of the work implement. The work implement further includes a sensor mounting system. The sensor mounting system includes a cover having a first surface and a second surface opposite the first surface. The cover is adapted to be removably coupled with at least one of the first side wall, the second side wall, and the plate member, such that the cover is in alignment with the opening. Upon coupling of the cover with at least one of the first side wall, the second side wall, and the plate member, the second surface of the cover faces the hollow space. The sensor mounting system also includes a plurality of mechanical fasteners adapted to removably couple the cover with the work implement. The sensor mounting system further includes a sensor mounted on the second surface of the cover, such that, upon coupling of the cover with at least one of the first side wall, the second side wall, and the plate member, the sensor is at least partially received within the hollow space.

Other features and aspects of this disclosure will be apparent from the following description and the accompanying drawings.

BRIEF DESCRIPTION OF THE DRAWINGS

FIG. 4A is a perspective view illustrating a first side wall of the work implement of FIG. 2A, according to another embodiment of the present disclosure;

FIG. 4B illustrates the sensor mounting system coupled to the first side wall of FIG. 4A, according to another embodiment of the present disclosure.

DETAILED DESCRIPTION

Figure 1:
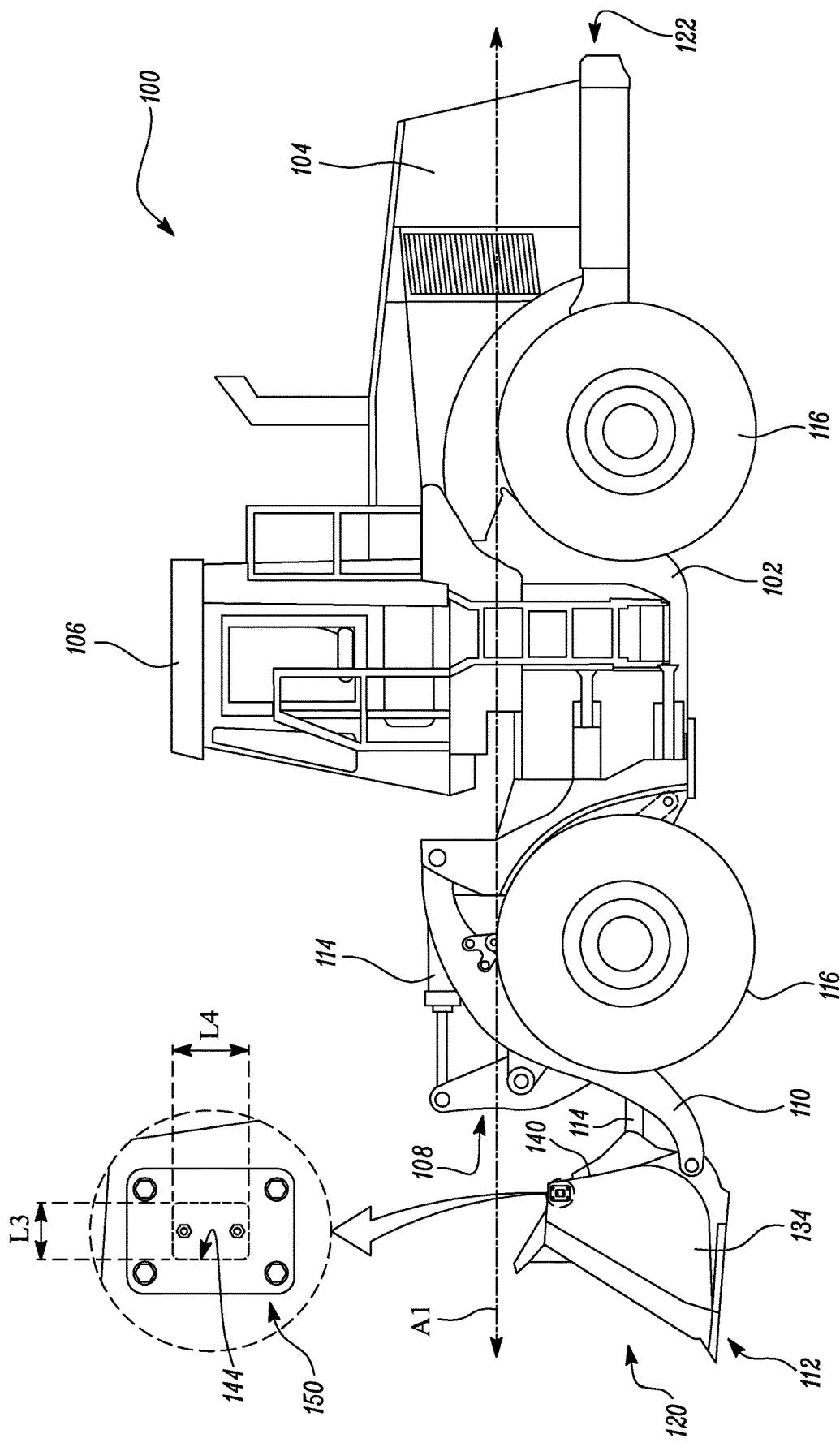
FIG. 1 is a side view of a construction machine, according to an embodiment of the present disclosure.

Wherever possible, the same reference numbers will be used throughout the drawings to refer to the same or like parts. Referring to FIG. 1, a side view of an exemplary construction machine 100 is illustrated. The construction machine 100 is embodied as a wheel loader that may be used for purposes, such as, construction, landscaping, agriculture, and the like. Alternatively, the construction machine 100 may be embodied as a dozer, an excavator, a tractor having one or more work implements, a motor grader, a scraper, etc. that may be used in various industries to move, remove, or load materials, such as, asphalt, debris, dirt, snow, feed, gravel, logs, raw minerals, recycled material, rock, sand, woodchips, etc. It should be noted that the construction machine 100 may embody any type of machine that includes a work implement.

The construction machine 100 includes a frame 102 having a front end 120 and a rear end 122 opposite the front end 120. The frame 102 supports various components of the construction machine 100, such as a power source (not shown), thereon. The power source may include an engine, such as an internal combustion engine, batteries, motors, and the like. The power source provides power to the construction machine 100 for operational and mobility requirements. The construction machine 100 includes a hood 104 proximate to the rear end 122 of the frame 102. The hood 104 encloses the power source therein.

The construction machine 100 further includes an operator cabin 106 supported by the frame 102. The operator cabin 106 includes one or more controls (not shown), such as, joysticks, pedals, levers, buttons, switches, knobs, audio visual devices, operator consoles, a steering wheel, and the like. The controls may enable an operator to control the construction machine 100 during operation.

The construction machine 100 also includes a linkage assembly 108 movably coupled to the frame 102. The linkage assembly 108 is disposed proximate to the front end 120 of the frame 102. The linkage assembly 108 includes an arm 110 movably coupled to the frame 102. The construction machine 100 also includes a work implement 112 movably coupled to the linkage assembly 108. The work implement 112 may be used to perform one or more work operations, such as, material loading, stock piling, dumping, and the like. The work implement 112 is embodied as a bucket herein. It should be noted that a design of the bucket illustrated herein is exemplary in nature, and the bucket may include any other design and/or shape. Further, the work implement 112 may include any other type of work implement, such as, a blade, a ripper, and the like.

The linkage assembly 108 also includes one or more actuators 114 (only two of which are illustrated in FIG. 1) to effectuate a movement of the work implement 112. In other words, the work implement 112 may be movable based on operation of the one or more actuators 114 associated with the linkage assembly 108. Further, the actuators 114 may include a hydraulic actuator or a pneumatic actuator. The construction machine 100 further includes a number of wheels 116. The wheels 116 provide support and mobility to the construction machine 100 on grounds.

Figures 2A, 2B:
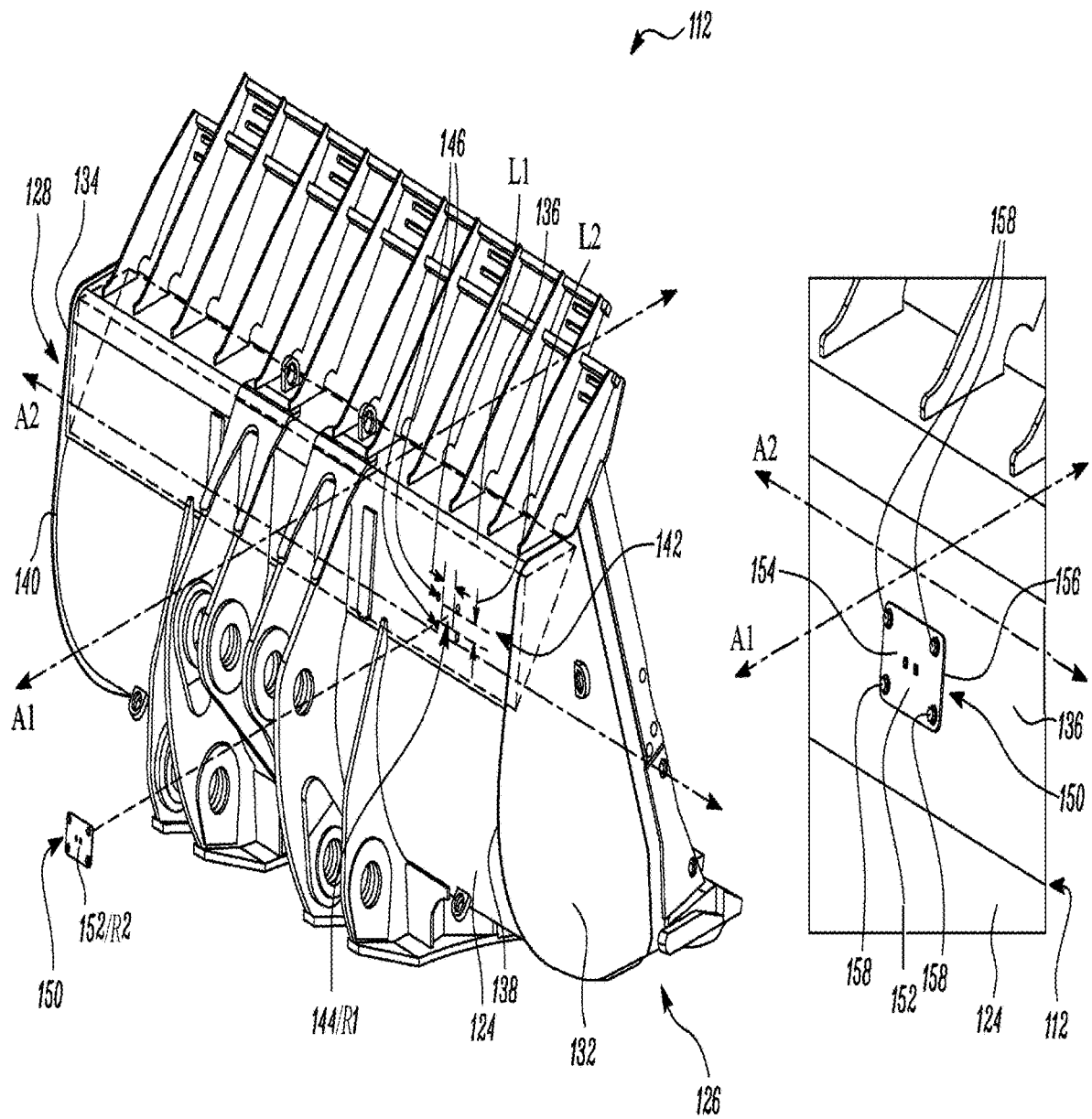
FIG. 2A is a perspective view of a work implement of the construction machine of FIG. 1, according to an embodiment of the present disclosure.
FIG. 2B illustrates a sensor mounting system coupled to a plate member of the work implement of FIG. 2A, according to an embodiment of the present disclosure.

FIG. 2A illustrates a perspective view of the work implement 112. As illustrated in FIG. 2A, the work implement 112 defines a longitudinal axis A1 and a lateral axis A2 orthogonal to the longitudinal axis A1. The work implement 112 is symmetrical about a plane of symmetry that is parallel to the longitudinal axis A1 and orthogonal to the lateral axis A2. The work implement 112 includes a collection member 124 having a first end 126 and a second end 128 spaced apart from the first end 126 along the lateral axis A2 of the work implement 112. The collection member 124 defines a material receiving space (not shown herein). The material receiving space may hold various types of materials therein. The collecting member 124 may include a generally curved profile.

The work implement 112 also includes a first side wall 132 extending from the first end 126 of the collection member 124 along the longitudinal axis A1 of the work implement 112. The work implement 112 further includes a second side wall 134 spaced apart from the first side wall 132 along the lateral axis A2. The second side wall 134 extends from the second end 128 of the collection member 124 along the longitudinal axis A1. The first side wall 132 may be substantially similar in design and dimensions to the second side wall 134. The work implement 112 further includes a plate member 136 coupled to the collection member 124, the first side wall 132, and the second side wall 134. The plate member 136 extends along the lateral axis A2 between the first side wall 132 and the second side wall 134. In the illustrated example of FIG. 2A, the plate member 136 includes a torque tube.

Further, the first side wall 132 includes a first side edge 138, such that the plate member 136 is coupled to the first side wall 132 at the first side edge 138. Furthermore, the second side wall 134 includes a second side edge 140, such that the plate member 136 is coupled to the second side wall 134 at the second side edge 140.

The collection member 124, the first side wall 132, the second side wall 134, and the plate member 136 together define a hollow space 142 of the work implement 112. Moreover, the first side wall 132, the second side wall 134, or the plate member 136 define an opening 144 that communicates with the hollow space 142 of the work implement 112. In the illustrated example of FIG. 2A, the plate member 136 defines the opening 144 that communicates with the hollow space 142 of the work implement 112. The opening 144 may be defined proximate to the first end 126 or the second end 128 of the collection member 124. In the illustrated example of FIG. 2A, the opening 144 is defined proximate to the first end 126 of the collection member 124.

The opening 144 in the plate member 136 has a first length "L1" extending along the lateral axis A2 and a second length "L2" orthogonal to the first length "L1". The first length "L1" is greater than the second length "L2". Further, the opening 144 includes a first area "R1". Furthermore, the work implement 112 may include a number of first throughholes 146 proximate to the opening 144. In the illustrated example of FIG. 2A, the work implement 112 includes four first through-holes 146. Alternatively, a total number of the first through-holes 146 may vary, as per application requirements. In some examples, an inner surface of the plate member 136 may include a number of weld nuts (not shown), such that each weld nut may align with a corresponding first through-hole 146. The weld nuts may be coupled to the work implement 112 before an assembly of the work implement 112.

In another example, the opening 144 may be defined proximate to the second end 128, without any limitations. Further, in other examples, the opening 144 may be defined in the first side wall 132 or the second side wall 134 proximate to the first side edge 138 and the second side edge 140, respectively. For example, as illustrated in FIG. 1, the opening 144 is defined in the second side wall 134 proximate to the second side edge 140. In some examples, the opening 144 in the second side wall 134 has a first length "L3" extending along the longitudinal axis A1 and the second length "L4" orthogonal to the first length "L3". The second length "L4" is greater than the first length "L3".

Referring now to FIG. 2B, the work implement 112 further includes a sensor mounting system 150. The sensor mounting system 150 may be removably coupled with the first side wall 132 (see FIG. 4B), the second side wall 134 (see FIG. 1), or the plate member 136. In the illustrated example of FIG. 3, the sensor mounting system 150 is removably coupled with the plate member 136. Alternatively, as shown in FIG. 1, the sensor mounting system 150 may be removably coupled with the second side wall 134.

As illustrated in FIG. 2B, the sensor mounting system 150 includes a cover 152 having a first surface 154 and a second surface 156 (see FIG. 3) opposite the first surface 154. The first and second surfaces 154, 156 may have a substantially planar profile. The cover 152 may be made of a metallic material or a non-metallic material. For example, the cover 152 may be made of a sheet metal, or a material that may be cost-effective and durable to withstand loads during operation of the construction machine 100 (see FIG. 1). Alternatively, the cover 152 may be made of a polymer. Further, the cover 152 includes a second area "R2". In some examples, the second area "R2" of the cover 152 is greater than the first area "R1" of the opening 144 (see FIG. 2A). It should be noted that the second area "R2" of the cover 152 may be decided such that the cover 152 completely encloses the opening 144.

Further, the cover 152 is removably coupled with the first side wall 132, the second side wall 134, or the plate member 136, such that the cover 152 is in alignment with the opening 144. In the illustrated example of FIG. 2B, the cover 152 is removably coupled with the plate member 136. Further, upon coupling of the cover 152 with the first side wall 132, the second side wall 134, or the plate member 136, the second surface 156 of the cover 152 faces the hollow space 142 (see FIG. 2A). For example, when the cover 152 is coupled with the plate member 136, the second surface 156 of the cover 152 faces the hollow space 142. Additionally, based on the coupling of the cover 152 with the plate member 136, a portion of the second surface 156 of the cover 152 may be in contact with the plate member 136.

The sensor mounting system 150 further includes a number of mechanical fasteners 158 that removably couple the cover 152 with the work implement 112. The mechanical fasteners 158 may include bolts, screws, pins, and the like. In the illustrated example of FIG. 2B, the sensor mounting system 150 includes four mechanical fasteners 158. However, in other examples, the sensor mounting system 150 may include any number of mechanical fasteners 158, without any limitations.

Figure 3:
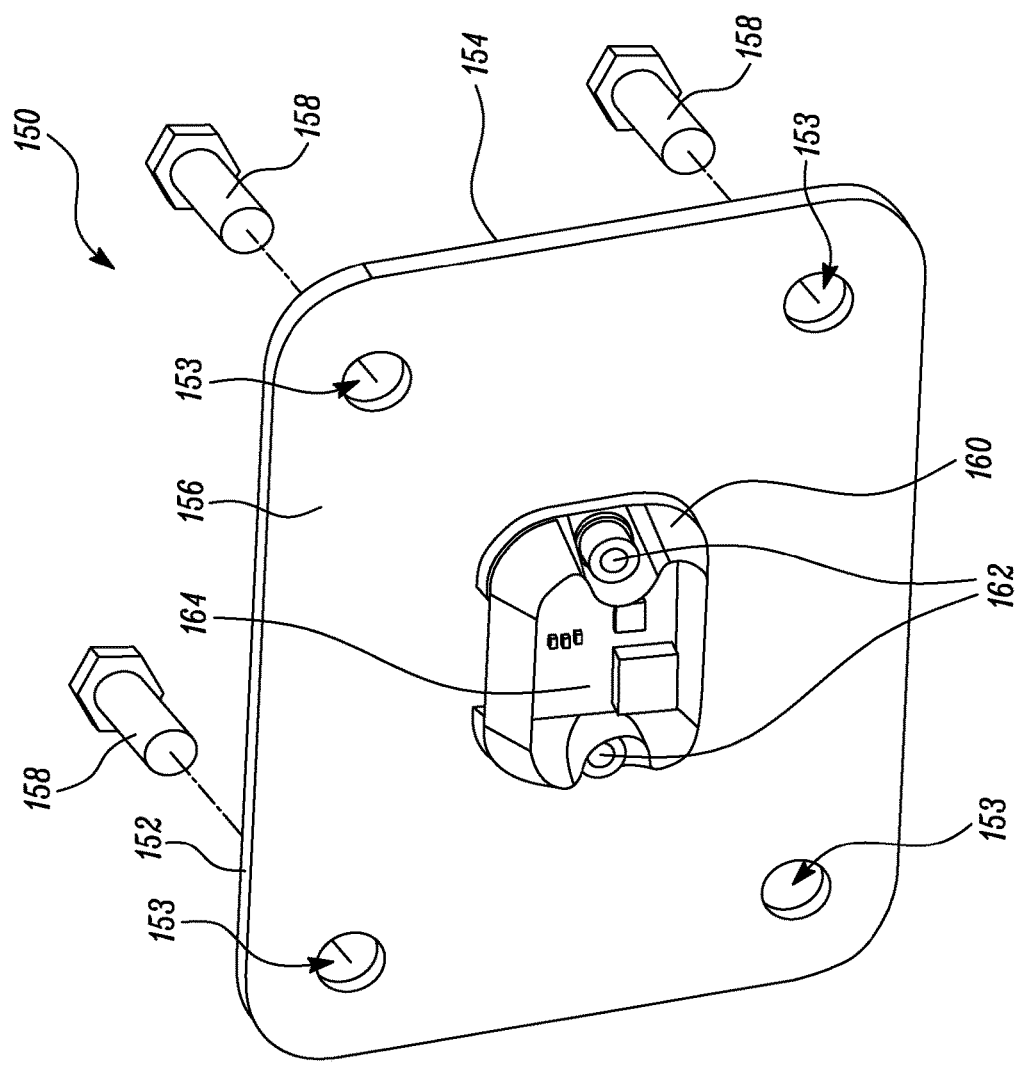
FIG. 3 is a perspective view of the sensor mounting system, according to an embodiment of the present disclosure.

Referring now to FIG. 3, the cover 152 defines a number of second through-holes 153. In the illustrated example of FIG. 3, the cover 152 includes four second through-holes 153. Alternatively, a total number of the second through-holes 153 may vary, as per application requirements. The second through-holes 153 in the cover 152 align with the first through-holes 146 (see FIG. 2A) in the work implement 112 for receiving a corresponding mechanical fastener 158.

The sensor mounting system 150 further includes a mounting bracket 160 coupled to the cover 152. A size of the mounting bracket 160 may be lesser than the first area "R1" of the opening 144 so that the opening 144 may allow passage of the mounting bracket 160 therethrough. The mounting bracket 160 may be made of a polymer, without any limitations. The mounting bracket 160 is coupled to the cover 152 by one or more fastening devices 162. In the illustrated example of FIG. 3, the fastening devices 162 includes a pair of mechanical fasteners. More particularly, the fastening devices 162 include a nut and bolt arrangement. Alternatively, the fastening devices 162 may include screws, pins, and the like. In other examples, the fastening devices 162 may include adhesives, spring-loaded clamps, and the like, without any limitations. Further, the mounting bracket 160 may be coupled with the cover 152 by a magnetic lock arrangement, a snap fit arrangement, and the like.

The sensor mounting system 150 further includes a sensor 164 mounted on the second surface 156 of the cover 152. Specifically, the sensor 164 is placed within the mounting bracket 160 and mounted on the second surface 156 of the cover 152. The mounting bracket 160 may hold and support the sensor 164. Further, upon coupling of the cover 152 with the first side wall 132, the second side wall 134, or the plate member 136, the sensor 164 is at least partially received within the hollow space 142 (see FIG. 2A).

In some examples, the sensor 164 is a Bluetooth sensor. For example, the sensor 164 may generate a signal indicative of a type of the work implement 112 that is currently coupled with the construction machine 100 (see FIG. 1). It should be noted that the present disclosure is not limited by a type of the sensor 164 or a total number of the sensor 164. Accordingly, the sensor mounting system 150 may include more than one sensor 164. Further, the sensor 164 may be used for any other purpose, and may embody any other type of sensor, such as, a Radio-frequency Identification (RFID) sensor, without any limitations.

FIG. 4A illustrates another embodiment of the present disclosure. As illustrated in FIG. 4A, the first side wall 132 of the work implement 112 defines the opening 144. The opening 144 is defined in the first side wall 132 proximate to the first side edge 138 so that the opening 144 is in communication with the hollow space 142 (see FIG. 4A). The opening 144 in the first side wall 132 has a first length "L3" extending along the longitudinal axis A1 and a second length "L4" orthogonal to the first length "L3". The second length "L4" is greater than the first length "L3".

Referring now to FIG. 4B, the cover 152 is coupled with the first side wall 132, such that the cover 152 is in alignment with the opening 144 (see FIG. 4A). Upon coupling of the cover 152 with the first side wall 132, the second surface 156 of the cover 152 faces the hollow space 142. Further, upon coupling of the cover 152 with the first side wall 132, a portion of the second side 156 of the cover 152 is in contact with the first side wall 132. Moreover, upon coupling of the cover 152 with the first side wall 132, the sensor 164 (see FIG. 3) is at least partially received within the hollow space 142 (see FIG. 2A).

Figure 5C:
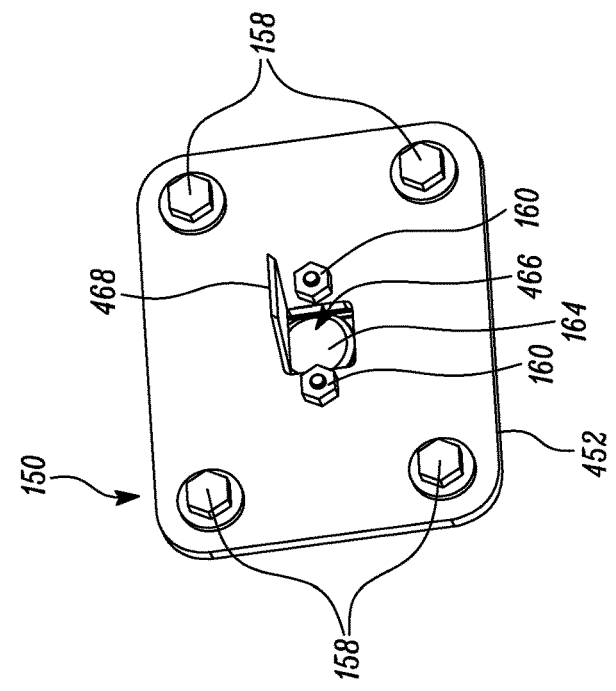
FIGS. 5A to 5C are perspective views of different designs of a cover associated with the sensor mounting system of FIG. 2A, according to various embodiments of the present disclosure.
Figure 5A:
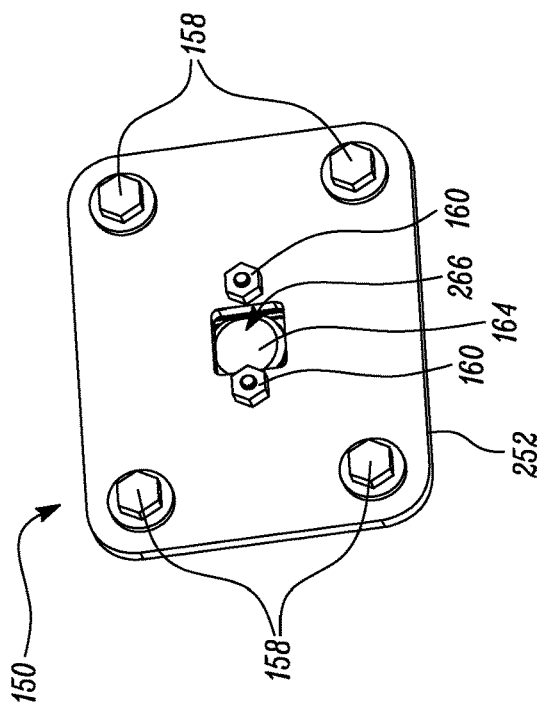

Referring to FIG. 5A, a schematic perspective view of the sensor mounting system 150 is illustrated, in accordance with another embodiment of the present disclosure. The sensor mounting system 150 includes a cover 252 that may be coupled with the work implement 112 (see FIGS. 1-2B). The cover 252 may be substantially similar to the cover 152 shown in FIGS. 2B and 3. However, the cover 252 defines one or more cut-outs 266, such that the one or more cut-outs 266 is in alignment with the sensor 164. The cut-out 266 may be provided when the cover 252 is made of a metallic material in order to improve the transmission and receipt of signals from the sensor 164. In the illustrated example of FIG. 5A, the cover 252 includes a single cut-out 266. The cut-out 266 is substantially square in shape. However, in other examples, the cut-out 266 may include a rectangular shape, a circular shape, and the like, based on application requirements. It should be noted that the cut-out 266 may include a shape and size that may allow uninterrupted transmission and receipt of signals from the sensor 164. In some examples, the cut-out 266 may be covered by a transparent piece of plastic for protecting the sensor 164 from dust and debris.

Figure 5B:
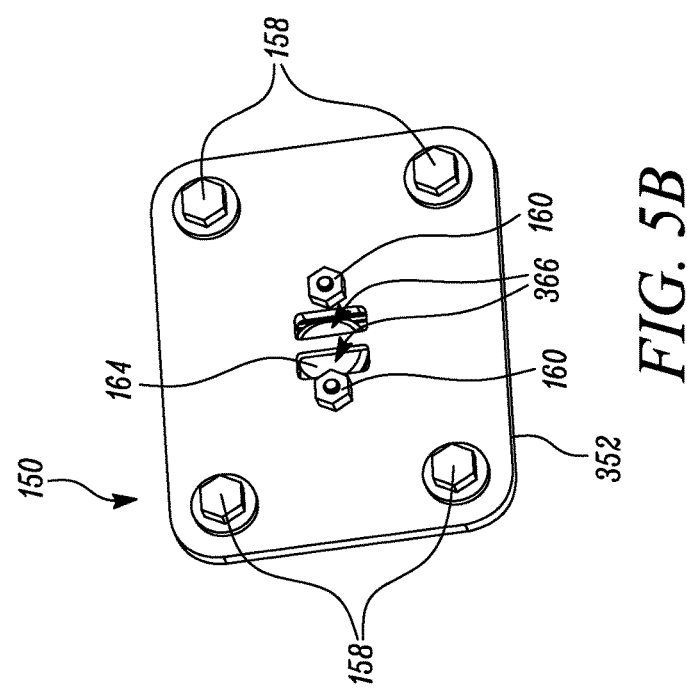

Referring to FIG. 5B, a schematic perspective view of the sensor mounting system 150 is illustrated, in accordance with yet another embodiment of the present disclosure. The sensor mounting system 150 includes a cover 352 may be coupled with the work implement 112 (see FIGS. 1-2B). The cover 352 may be substantially similar to the cover 152 shown in FIGS. 2B and 3. However, the cover 352 defines one or more cut-outs 366, such that the one or more cut-outs 366 is in alignment with the sensor 164. In the illustrated example of FIG. 5B, the cover 352 include a pair of cut-outs 366. The cut-outs 366 may be provided when the cover 352 is made of a metallic material in order to improve the transmission and receipt of signals from the sensor 164. The cut-outs 366 are substantially rectangular in shape. In some examples, the cover 352 may define more than two cut-outs 366, based on application requirements. It should be noted that the cut-out 366 may include a shape and size that may allow uninterrupted transmission and receipt of signals from the sensor 164. In some examples, the cut-outs 366 may be covered by a transparent piece of plastic for protecting the sensor 164 from dust and debris.

Referring to FIG. 5C, a schematic perspective view of the sensor mounting system 150 is illustrated, in accordance with another embodiment of the present disclosure. The sensor mounting system 150 includes a cover 452 that may be couples with the work implement 112 (see FIGS. 1-2B). The cover 452 may be substantially similar to the cover 152 explained in relation to FIGS. 2B and 3. However, the cover 452 defines a single cut-out 466. Alternatively, the cover 452 may include two or more cut-outs 466. The cut-outs 466 may be provided when the cover 452 is made of a metallic material in order to improve the transmission and receipt of signals from the sensor 164. In some examples, the cut-out 466 may be covered by a flap 468. The flap 468 may be made of a material that may allow uninterrupted transmission and receipt of signals from the sensor 164. The flap 468 may be made of a flexible material, such as, rubber. Alternatively, the flap 468 may be made of a plastic material. The flap 468 may prevent ingress of dust, debris, or water into the cut-out 466, thereby protecting the sensor 164.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The work implement 112 includes the sensor mounting system 150 that enables coupling of the sensor 164 with the work implement 112. The sensor 164 may allow sharing of information regarding a type of the work implement 112 that is presently coupled with the construction machine 100. The sensor mounting system 150 described herein may be cost-effective, durable, and retrofittable. The sensor mounting system 150 includes the cover 152, 252, 352, 452 that may be removably coupled with the work implement 112. Further, the cover 152, 252, 352, 452 may have a simple and cost-effective design. Furthermore, the cover 152, 252, 352, 452 may be easy to remove and replace. Moreover, the sensor mounting system 150 is designed such that when the sensor mounting system 150 is coupled with the work implement 112, the sensor 164 is disposed within a preexisting enclosed section i.e., the hollow space 142 of the plate member 136 (i.e., the torque tube).

The sensor mounting system 150 may be coupled to the work implement 112 without any major changes to a structure of the work implement 112. In some examples, weld nuts may be coupled with the work implement 112 to minimize any modifications to the structure of the work implement 112.

Further, the sensor mounting system 150 may be coupled to any one of the plate member 136, the first side wall 132, or the second side wall 134. The sensor mounting system 150 may be positioned proximate to a top edge of the work implement 112, thus a probability of any ground contact with the sensor 164 may be avoided. Further, as the sensor 164 is received within the hollow space 142, any contact of the sensor 164 with materials being handled by the work implement 112, such as during material overflow from the work implement 112, may be avoided.

Moreover, in some examples, the cover 152 may be non-metallic to improve transmission and receipt of signals from the sensor 164. In such examples, the cover 152 may be loosely connected with the work implement 112. However, in other examples, the cover 252, 352, 452 may be metallic. In such examples, the cover 252, 352, 452 may include the cut-outs 266, 366, 466 to improve transmission and receipt of signals from the sensor 164. In an example, the cover 452 may include the flap 468 so that the sensor 164 may be protected from dust or debris.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A work implement for a construction machine, the work implement comprising:

a collection member having a first end and a second end spaced apart from the first end along a lateral axis of the work implement;
a first side wall extending from the first end of the collection member along a longitudinal axis of the work implement;
a second side wall spaced apart from the first side wall along the lateral axis, wherein the second side wall extends from the second end of the collection member along the longitudinal axis;
a plate member coupled to the collection member, the first side wall, and the second side wall, wherein the collection member, the first side wall, the second side wall, and the plate member together define a torque tube of the work implement, and wherein at least one of the first side wall, the second side wall, and the plate member define an opening that communicates with the torque tube of the work implement; and
a sensor mounting system including:
a cover having a first surface and a second surface opposite the first surface, wherein the cover is adapted to be removably coupled with at least one of the first side wall, the second side wall, and the plate member, such that the cover is in alignment with the opening, wherein, upon coupling of the cover with at least one of the first side wall, the second side wall, and the plate member, the second surface of the cover faces the torque tube;
a plurality of mechanical fasteners adapted to removably couple the cover with the work implement; and
a sensor mounted on the second surface of the cover, such that, upon coupling of the cover with at least one of the first side wall, the second side wall, and the plate member, the sensor is at least partially received within the torque tube.

2. The work implement of claim 1, wherein the opening is defined proximate to at least one of the first end and the second end of the collection member.

3. The work implement of claim 1, wherein the opening in the plate member has a first length extending along the lateral axis and a second length orthogonal to the first length, and wherein the first length is greater than the second length.

4. The work implement of claim 1, wherein the opening in at least one of the first side wall and the second side wall has a first length extending along the longitudinal axis and a second length orthogonal to the first length, and wherein the second length is greater than the first length.

5. The work implement of claim 1, wherein the first side wall includes a first side edge, such that the plate member is coupled to the first side wall at the first side edge, and wherein the opening is defined in the first side wall proximate to the first side edge.

6. The work implement of claim 1, wherein the second side wall includes a second side edge, such that the plate member is coupled to the second side wall at the second side edge, and wherein the opening is defined in the second side wall proximate to the second side edge.

7. The work implement of claim 1, wherein the cover is made of at least one of a metallic material and a non-metallic material.

8. The work implement of claim 1, wherein the opening includes a first area, wherein the cover includes a second area, and wherein the second area of the cover is greater than the first area of the opening.

9. The work implement of claim 1, wherein the cover defines at least one cut-out, such that the at least one cut-out is in alignment with the sensor.

10. The work implement of claim 1, wherein the sensor is a Bluetooth sensor.

11. A construction machine comprising:
a frame;
a linkage assembly movably coupled to the frame; and
a work implement movably coupled to the linkage assembly, the work implement including:
a collection member having a first end and a second end spaced apart from the first end along a lateral axis of the work implement;
a first side wall extending from the first end of the collection member along a longitudinal axis of the work implement;
a second side wall spaced apart from the first side wall along the lateral axis, wherein the second side wall extends from the second end of the collection member along the longitudinal axis;
a plate member coupled to the collection member, the first side wall, and the second side wall, wherein the collection member, the first side wall, the second side wall, and the plate member together define a torque tube of the work implement, and wherein at least one of the first side wall, the second side wall, and the plate member define an opening that communicates with the torque tube of the work implement; and
a sensor mounting system including:
a cover having a first surface and a second surface opposite the first surface, wherein the cover is adapted to be removably coupled with at least one of the first side wall, the second side wall, and the plate member, such that the cover is in alignment with the opening, wherein, upon coupling of the cover with at least one of the first side wall, the second side wall, and the plate member, the second surface of the cover faces the torque tube;
a plurality of mechanical fasteners adapted to removably couple the cover with the work implement; and
a sensor mounted on the second surface of the cover, such that, upon coupling of the cover with at least one of the first side wall, the second side wall, and the plate member, the sensor is at least partially received within the torque tube.

12. The construction machine of claim 11, wherein the opening is defined proximate to at least one of the first end and the second end of the collection member.

13. The construction machine of claim 11, wherein the opening in the plate member has a first length extending along the lateral axis and a second length orthogonal to the first length, and wherein the first length is greater than the second length.

14. The construction machine of claim 11, wherein the opening in at least one of the first side wall and the second side wall has a first length extending along the longitudinal axis and a second length orthogonal to the first length, and wherein the second length is greater than the first length.

15. The construction machine of claim 11, wherein the first side wall includes a first side edge, such that the plate member is coupled to the first side wall at the first side edge, and wherein the opening is defined in the first side wall proximate to the first side edge.

16. The construction machine of claim 11, wherein the second side wall includes a second side edge, such that the plate member is coupled to the second side wall at the second side edge, and wherein the opening is defined in the second side wall proximate to the second side edge.

17. The construction machine of claim 11, wherein the opening includes a first area, wherein the cover includes a second area, and wherein the second area of the cover is greater than the first area of the opening.

18. The construction machine of claim 11, wherein the cover defines at least one cut-out, such that the at least one cut-out is in alignment with the sensor.

19. The construction machine of claim 11, wherein the sensor is a Bluetooth sensor.

20. A work implement for a construction machine, the work implement comprising:
   a collection member having a first end and a second end spaced apart from the first end along a lateral axis of the work implement;
   a first side wall extending from the first end of the collection member along a longitudinal axis of the work implement;
   a second side wall spaced apart from the first side wall along the lateral axis, wherein the second side wall extends from the second end of the collection member along the longitudinal axis;
   a plate member coupled to the collection member, the first side wall, and the second side wall, wherein the collection member, the first side wall, the second side wall, and the plate member together define a torque tube of the work implement, and wherein at least one of the first side wall, the second side wall, and the plate member define an opening that communicates with the torque tube of the work implement; and
   a sensor mounting system including:
      a cover; and
      a sensor mounted on the cover, such that, upon coupling of the cover with at least one of the first side wall, the second side wall, and the plate member, the sensor is at least partially received within the torque tube via the opening.

* * * * *